April 21, 1959        B. BECKLEY        2,883,233
METHOD OF MAKING MOLDED SHELL TRAILER BODIES
Filed July 19, 1956        2 Sheets-Sheet 1
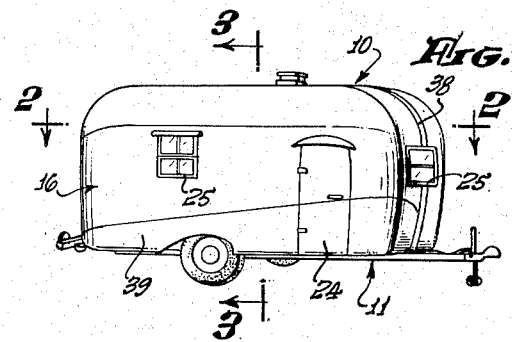
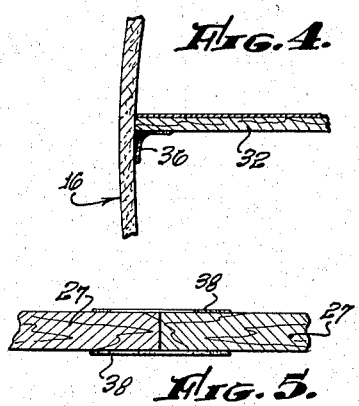
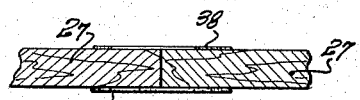
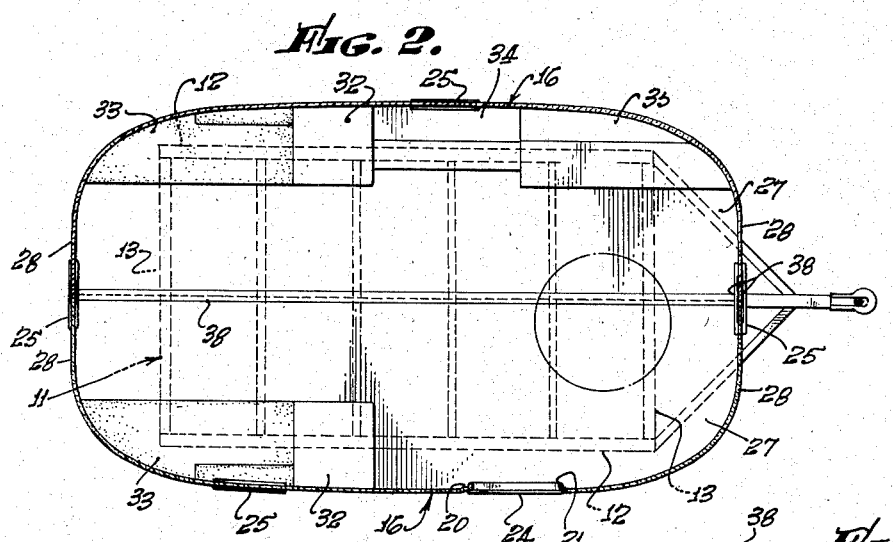
BENTON BECKLEY,
      INVENTOR.
BY
ATTORNEY.

April 21, 1959 B. BECKLEY 2,883,233
METHOD OF MAKING MOLDED SHELL TRAILER BODIES
Filed July 19, 1956 2 Sheets-Sheet 2
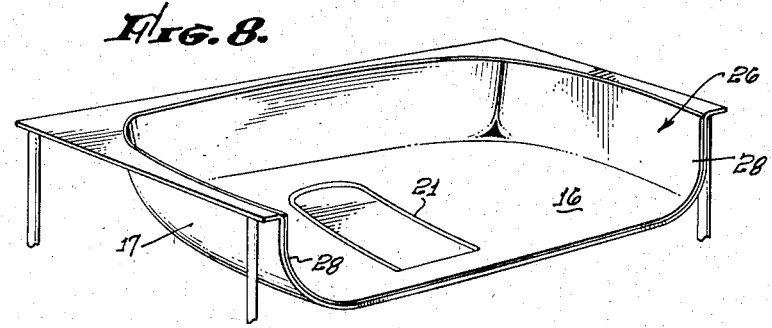
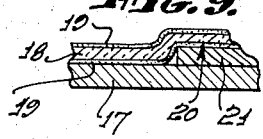
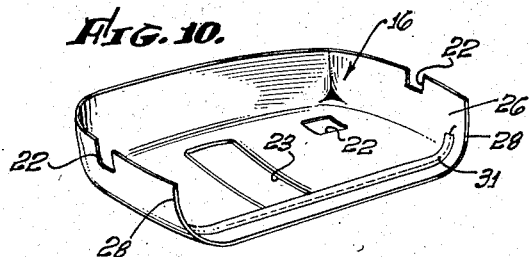
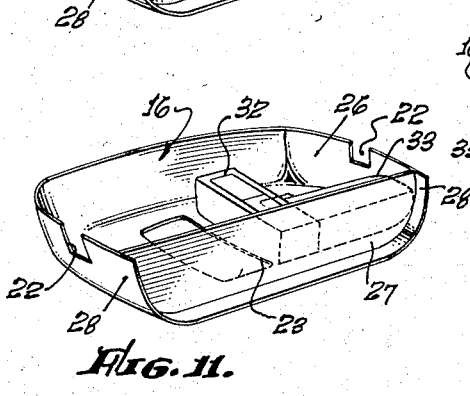
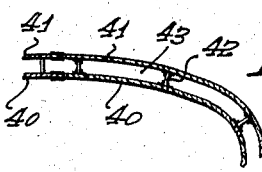
BENTON BECKLEY,
INVENTOR.
BY
ATTORNEY.

United States Patent Office 2,883,233
Patented Apr. 21, 1959

2,883,233
METHOD OF MAKING MOLDED SHELL TRAILER BODIES

Benton Beckley, Palm Springs, Calif.

Application July 19, 1956, Serial No. 598,907

13 Claims. (Cl. 296—28)

This invention relates generally to the art of making house trailer bodies such as are mounted on wheeled frames to be pulled by automobiles, and more particularly has to do with a novel method of manufacturing the body shell of a housetrailer wherein the shell may be molded in essentially single sheet sections of open sided construction in a manner such as facilitates their reinforcement by connecting the trailer flooring and interior fixtures with the sections prior to their assembly, and further enabling ready assemblage of the reinforced sections by simply connecting them together at their edges to form the completed trailer body.

Speaking with reference to the design and manufacture of trailer bodies in general, it is found desirable from the standpoint of economy and simplified construction to reduce the number of steps involved in fabricating the body to a minimum consistent with good workmanship, and high strength and reliability in use of the trailer. The cost or expense of producing trailers is related to the number of body parts required and tooling necessary to make those parts, so that if the trailer design is such as to necessitate relatively few and inexpensive parts and tooling it becomes possible to manufacture desirably competitive trailers. However, in the past their construction has been either of wood or metal parts requiring relatively complex procedures in their fabrication in order to assure that the trailer body had sufficient strength to withstand the twisting and jolting loads imposed in service, together with other drawbacks including the tendency of metal trailer shells to absorb and dissipate heat too rapidly in summer and winter and low strength characteristics of wooden shells.

The present invention has for its primary purpose the elimination of the above difficulties encountered where trailer bodies are made of wood or metal, and the provision of a relatively simple, high strength, lightweight and inexpensive trailer body construction through the use of glass fiber reinforced plastic materials in molding the body shell together with the design of the body sections and the methods and procedures used in assembling them, all to the end that the trailer body may be quickly and readily fabricated and assembled at lowest cost without sacrificing strength and appearance requirements. This object is attained in practice by molding glass fibers in cloth and/or mat form with plastic binder resin to provide desirably shaped sections of the body shell having open inner sides, reinforcing the molded sections prior to assembling them by conveniently and simply connecting flooring or floor units with the sections through their open sides in the as molded condition, and also connecting trailer fixtures such as cabinets, bed frames and the like with the body sections by introducing them through the open sides, and finally assembling the section by interconnecting the opposite edge portions when the sections are brought together to form the completed trailer body. Also, door and window openings are quickly and readily cut where desired in the body sections and door and window frames mounted in the openings while the sections remain in disassembled condition. As a result of this novel method of trailer construction, the separate parts of the body shell may be for all practical purposes completed as regards the mounting of interior fixtures, floor and other essentials together with the provision of doors and windows while the trailer sections are accessible through their inner sides prior to final section assembly, thereby reducing the cost of trailer construction to a minimum.

Other objects of the invention include the provision of separate floor units to be connected with the separate trailer body sections and brought together at their edges for simple connection during trailer assembly, methods of connecting edge portions of the body sections and floor units for maximum trailer strength, the provision of inner and outer left and right shell halves to be interconnected for forming a higher strength durable shell with greater capacity for heat insulation, and methods of integrally embedding trailer wiring within the shell sections.

These and other objects of the invention as well as the details of an illustrative embodiment, will be more fully understood from the following detailed description of the drawings, in which:

Fig. 1 is a pictorial view of the trailer body mounted on its wheeled frame;

Fig. 2 is an enlarged horizontal section taken on line 2—2 of Fig. 1;

Fig. 3 is an enlarged vertical section taken on line 3—3 of Fig. 1;

Fig. 4 shows a method of joining interior trailer fixtures with the body shell;

Fig. 5 is an enlarged section through the joint formed by the right and left floor units;

Fig. 6 is an enlarged section through the joint formed between sections at the trailer top;

Fig. 7 shows a method of joining the floor with the body shell and also embedding wiring in the shell;

Fig. 8 is a perspective view of the body section molded with a section extending therein;

Fig. 9 shows a method of forming the offset door jamb in a body section;

Fig. 10 illustrates a body section removed from the mold;

Fig. 11 shows the flooring and interior fixtures connected to the disassembled body section of Fig. 10;

Fig. 12 is a perspective view of the right and left body shell halves and wheeled trailer frame as they are brought together during assembly; and Fig. 13 is a section taken through inner and outer shell sections showing a modified form of trailer construction.

In Fig. 1 the trailer body generally designated at 10 is shown mounted on the wheeled frame 11 better illustrated at Figs. 3 and 12 to include spaced side channels 12 interconnected by cross members 13 on which right and left trailer floor units 14 are suitably supported and connected as by bolts 15, the frame extending and being hidden between opposite sides of the trailer body.

The body shell comprises right and left sections or panels or halves 16 shown in Figs. 2 and 3 to be generally symmetrical and curved in horizontal and vertical section for strength purposes. Furthermore, the fore and aft portions of the shell sections are similarly curved in horizontal section so that the right and left sections may be formed in the same mold 17 illustrated in Fig. 8.

In constructing the molded shell sections, glass fibers in cloth and/or mat form are first wet or impregnated with suitable liquid binder resin, such as one of the synthetic polyester, epoxy, or phenolic resins, containing cure promoting agents. In wet condition, the impregnated cloth or mat is laid or forced into shape in the easily accessible horizontal mold 17, and built up to desired thickness as dictated by strength requirements of the shell by providing successive layers or laminations of the impregnated cloth or mat. For example, glass fiber mat 18 thicker than fiber cloth may be interposed in resin impregnated condition between inner and outer glass cloth layers 19, also resin impregnated to build up the section thickness and to provide suitably smooth inner and outer section surfaces as shown in Fig. 9. An inwardly offset door jamb 20 is easily formed in the mold by connecting a frame 21 of the exterior shape of the door at the inside of the mold in door position, so that when the impregnated glass fiber layers are laid in the mold they will be inwardly offset to desired amount at door position.

Through the passage of time the binder resin cures and hardens with the result that a high strength trailer shell section 16 is formed in the horizontal mold 17, from which it may be easily removed by upward tilting of the mold to vertical position. Suitable window openings 22 are then cut in the section as shown in Fig. 10 as well as the door opening 23 within inwardly offset jamb 20. The door 24 and window frames 25 may then be connected into the provided openings, free access thereto being had through the open inner side 26 of the shell section since it is not yet assembled with the opposite section.

While the section 16 remains in the mold or after its removal therefrom but prior to assembly with the opposite section, reinforcing floor unit 27 made of wood or other similar material is connected with the section opposite ends 28 and inside through the open inner side 26, such mounting of the floor unit being readily accomplished since the shell section 16 is freely accessible at its inner side as shown in Fig. 11. Strips of glass fiber cloth 29 impregnated with binder resin may be laid against opposite sides of the floor near the edge thereof abutting the body section wall and also against the latter above and below the floor as shown in Fig. 7, the resin impregnated strips when cured firmly connecting the floor and shell section. Also shown in Fig. 7 is the electrical wiring 30 held in position against the inside of section 16 below floor level by a strip of impregnated glass fiber cloth 31.

For further reinforcement of the shell sections prior to assemblage thereof, the trailer interior fixtures such as cabinets 32, bed frames 33, cupboards 34, and other facilities 35 shown in Figs. 2, 3 and 11 may be connected to the section insides and to the floor units 27 by applying resin impregnated strips 36 in overlying relation with the fixtures and insides of the shells 16 as shown in Fig. 4, and it will be seen that providing the trailer sections with these fixtures is readily and easily accomplished while the sections remain in disassembled condition either in the mold or removed therefrom as shown in Figs. 10 and 11. Also prior to final assembly, the exposed insides of the sections 16 may be coated with a finish having an attractive appearance, such as with the asbestos material sold under the trade name "Zolotone."

After the trailer shell sections are suitably reinforced with flooring units 27 and interior fixtures together with such remaining ornamental or structural details as are desirable introduced into the section interiors through their open sides 26, the sections are then closed together as in Fig. 12 and interconnected at their abutting edge portions and also at the edge portions of the floor units 27 by running strips of resin impregated glass fiber cloth 38 over the joints formed by the abutting shell sections and floor units as shown in Figs. 5 and 6. When cured, the impregnated strips 38 hold the right and left shell sections and floor units in such strongly bonded interconnected condition that the trailer body will withstand much greater torsional twisting loads and road jolts than are normally encountered in trailer service. Formation of the trailer body sections and flooring in longitudinally split halves not only assures high strength assemblage thereof but also facilitates fabrication of symmetrical sections and flooring with minimum molding equipment. For further strengthening of the trailer shell, the lower portions 39 of the sections may comprise thicker laminations of mat and cloth fiber whereas the upper portions and top of the trailer are relatively thinner. It is readily seen that the curvature of the sections attributes materially to their torsional strength and also to overall trailer appearance.

For greater trailer body strength as where the length of the shell is substantially increased, inner and outer right and left shell sections 40 and 41 may be molded as described above for spaced connection of the inner and outer sections as by struts 42 prior to final assemblage of the right and left inner and outer sections. The air spaces between the sections provides more than adequate insulation against heat dissipation, since the single thickness trailer construction as described above is in itself a highly desirable heat insulator.

I claim:

1. The method of making a house trailer comprising molding glass fibers with binder resin to form right and left body shell halves with accessibly open inner sides and bottoms and to have outer sides curving convexly throughout substantially the entire half shell extents, reinforcing said shell halves by inserting rigid furniture and like floor panels through said open sides thereof and connecting said panels and furniture into the shell halves while the shell halves remain in disassembled condition in the mold so as to leave exposed the inner edges of the half shells and floor panels extending in a flat plane, assembling said shell halves and floor panels by interconnecting said exposed opposite edge portions thereof after the shell half open sides are closed together to form the completed trailer body containing said furniture, and connecting said floor panels to a rigid under frame beneath the panels and said shell.

2. The method of making a house trailer, comprising molding glass fibers with binder resin to form right and left body shell halves with accessibly open inner sides and bottoms, reinforcing said shell halves by inserting rigid furniture and right and left floor panels through said open sides thereof and connecting said panels and furniture into the shell halves while the shell halves remain in disassembled condition in the mold so as to leave exposed the inner edges of the half shells and floor panels extending in a flat plane, cutting window and door openings in the shell halves after their removal from the mold, assembling said shell halves and floor panels by interconnecting said exposed opposite edge portions thereof after the shell half open sides are closed together to form the completed trailer body containing said furniture, and connecting said floor panels to a rigid under frame beneath the panels and said shell.

3. The method of making a house trailer comprising molding glass fibers with binder resin to form right and left body shell halves with accessibly open inner sides and bottoms, reinforcing said shell halves by inserting rigid furniture and right and left wooden floor panels through said open sides thereof and connecting said panels and furniture into the shell halves while the shell halves remain is disassembled condition in the mold so as to leave exposed the inner edges of the half shells and floor panels extending in a flat plane, cutting window and door openings in the shell halves after their removal from the mold, assembling said shell halves and floor units by applying glass fibers and binder resin in a loop over said exposed opposite edge portions thereof after the shell half open sides are closed together to form the completed trailer body containing said furniture, and connecting said floor panels to a rigid under frame beneath the panels and said shell.

4. The method of claim 3 including applying electrical wiring and a covering layer of glass fiber and binder resin to said shell half projecting beneath the level of said floor panels.

5. The method of making a house trailer, comprising molding glass fibers with binder resin to form inner and outer right and left body shell halves with accessibly open inner sides and bottoms and to have outer sides curving convexly throughout substantially the entire half shell extents, reinforcing said inner shell halves by inserting rigid furniture and floor panels through said inner shell half open sides, connecting said furniture and panels into the inner shell halves and interconnecting the inner and outer halves in spaced relation while the right and left halves remain in disassembled condition so as to leave exposed the inner edges of the shell halves and floor panels in a flat plane, assembling said right and left shell halves by connecting said exposed opposite edge portions thereof after the halves are closed together to form the completed trailer body, and connecting said floor panels to a rigid under frame beneath the panels and said shell.

6. A house trailer body assembly, comprising upright complementary body half shells molded from glass fibers and binder resin to have accessibly open inner sides and bottoms in the as molded condition, each of said half shells being horizontally forwardly elongated and including continuous forward, rear, side and top walls the outsides of which have convex curvature throughout substantially the entire half shell extent, each of said half shells having inner edges extending in a longitudinal vertical plane, horizontally extending complementary floor panels respectively connected into the half shells in underlying spaced relation to the top walls thereof for reinforcing the assembled shell, each of said floor panels extending adjacent and being connected with the half shell front, rear and side walls and having an inner edge extending in said longitudinal vertical plane, and means interconnecting said half shells and said floor panels at said inner edges thereof so that the complementary half shells and floor panels are closed together forming a completely enclosed space within the shell, said space being free of shell supporting frame structure, said floor panels being sufficiently spaced above the bottom edge level of the half shell side walls to be carried by and transmit body shell loading to a frame underlying the floor panels between the opposite half shell side walls extending below the level of the floor panels.

7. The invention as defined in claim 6 in which each of said half shells is symmetrical with respect to a vertical plane extending laterally mid-way between the front and rear walls of said half shell.

8. The invention as defined in claim 6 in which said means interconnecting said half shells and floor panels comprise glass fiber cloth strips and binder resin impregnating said strips.

9. The invention as defined in claim 8 including trailer furniture in said half shells, and glass fiber cloth strips and binder resin impregnating said strips connecting said furniture with said half shells and floor panels.

10. The invention as defined in claim 8 in which one of said half shells includes a door frame in the plane of the shell curved side wall, said frame being substantially flush with the outer side of said wall.

11. The invention as defined in claim 8 in which the curved side wall of each half shell has increasing thickness along its downward extent acting to stiffen the half shell.

12. A house trailer body assembly, comprising upright complementary interior and exterior body half shells molded from glass fibers and binder resin to have accessibly open inner sides and bottoms in the as molded condition, each of said half shells being horizontally forwardly elongated and including continuous forward, rear, side and top walls the outsides of which have convex curvature throughout substantially the entire half shell extent, each of said half shells having inner edges extending in a longitudinal vertical plane, horizontally extending complementary floor panels respectively connected into the interior half shells in underlying spaced relation to the top walls thereof for reinforcing the assembled shell, each of said floor panels extending adjacent and being connected with the interior half shell front, rear and side walls and having an inner edge extending in said longitudinal vertical plane, and means interconnecting said exterior half shells, said interior half shells and said floor panels at said inner edges thereof so that the complementary half shells and floor panels are closed together forming a completely enclosed space within the interior shell, said space being free of shell supporting frame structure, said exterior shell halves being substantially uniformly outwardly spaced from said interior shell halves throughout their extents, and said floor panels being sufficiently spaced above the bottom edge levels of half shell side walls to be carried by and transmit body shell loading to a frame underlying the floor panels between the opposite half shell side walls extending below the level of said floor panels.

13. The invention as defined in claim 12 including a wheeled frame supporting said shell and connected only with said floor panels, said frame being everywhere inwardly spaced from the side walls.

References Cited in the file of this patent

UNITED STATES PATENTS

| | | |
|---|---|---|
| 1,953,515 | Smith | Apr. 3, 1934 |
| 2,197,950 | Schwenk | Apr. 23, 1940 |
| 2,242,269 | Siebler | May 20, 1941 |
| 2,349,940 | Craig | May 30, 1944 |
| 2,612,964 | Hobbs | Oct. 7, 1952 |
| 2,677,571 | Williams | May 4, 1954 |
| 2,730,772 | Jones | Jan. 17, 1956 |
| 2,731,682 | Evans | Jan. 24, 1956 |

FOREIGN PATENTS

| | | |
|---|---|---|
| 496,908 | Great Britain | Dec. 8, 1938 |

OTHER REFERENCES

"Fleet Built Plastic Bodies," in "Commercial Car Journal," February 1954, pages 82, 83, 130 and 131.